US008315277B2

(12) United States Patent
Gyselinck et al.

(10) Patent No.: US 8,315,277 B2
(45) Date of Patent: Nov. 20, 2012

(54) INTEGRATED ACCESS DEVICE, ASSOCIATED MODEM BOX AND SPLITTING MODULE

(75) Inventors: Luc Gyselinck, Sint Niklaas (BE); Bart Vercammen, Torhout (BE); Wouter Delva, Wevelgem (BE)

(73) Assignee: Thomson Licensing, Issy les Moulineaux (FR)

( * ) Notice: Subject to any disclaimer, the term of this patent is extended or adjusted under 35 U.S.C. 154(b) by 399 days.

(21) Appl. No.: 11/665,130

(22) PCT Filed: Sep. 30, 2005

(86) PCT No.: PCT/EP2005/054962
§ 371 (c)(1),
(2), (4) Date: Oct. 24, 2007

(87) PCT Pub. No.: WO2006/040272
PCT Pub. Date: Apr. 20, 2006

(65) Prior Publication Data
US 2008/0117935 A1      May 22, 2008

(30) Foreign Application Priority Data

Oct. 14, 2004  (EP) ..................... 04447229

(51) Int. Cl.
*H04J 1/02* (2006.01)
(52) U.S. Cl. ..................................... 370/488
(58) Field of Classification Search .................. 370/488; 725/111, 114, 133; 379/399.01, 413.02, 379/413.03, 413.04
See application file for complete search history.

(56) References Cited

U.S. PATENT DOCUMENTS

| | | | | |
|---|---|---|---|---|
| 6,029,047 A | * | 2/2000 | Ishida et al. | 725/106 |
| 6,272,219 B1 | * | 8/2001 | De Bruycker et al. | 379/399.01 |
| 6,356,562 B1 | * | 3/2002 | Bamba | 370/463 |
| 2002/0044525 A1 | * | 4/2002 | Czerwiec et al. | 370/216 |
| 2003/0137973 A1 | | 7/2003 | Kim et al. | |
| 2004/0107299 A1 | * | 6/2004 | Lee et al. | 709/249 |
| 2005/0066071 A1 | * | 3/2005 | Cohen et al. | 710/8 |

FOREIGN PATENT DOCUMENTS

| | | | |
|---|---|---|---|
| JP | 11096891 A | | 4/1999 |
| JP | 2001045184 | * | 2/2001 |
| JP | 2003069736 A | | 3/2003 |
| JP | 2003534728 A | | 11/2003 |
| JP | 2004007317 A | | 1/2004 |
| WO | WO 99/18712 | * | 4/1999 |

OTHER PUBLICATIONS

Verilink: "NetEngine 6102 Series" 'Online! 2003, XP002329886.
Search Report Dated Feb. 24, 2006.

* cited by examiner

*Primary Examiner* — Mark Rinehart
*Assistant Examiner* — Christopher R Crompton
(74) *Attorney, Agent, or Firm* — Robert D. Shedd; Jeffrey M. Navon

(57) ABSTRACT

The present invention concerns a modem box, a splitting module, and an integrated access device. The modem box comprises upside communication means for coupling with central equipments through central signals, the latter being modulated for at least one of the central equipments, downside communication means coupling the modem box with terminal equipments through terminal signals, transfer means between the upside and downside communication means, and modem means for doing transformation between the modulated central signals and demodulated signals among the terminal signals. The modem box comprises an outer contact surface receiving a splitting module, which does transformation between the central signals and grouped signals formed with a multiplexing of the latter, and the upside communication means comprise at least one connection element arranged with that contact surface, in contact with at least one respective connection element of the splitting module.

7 Claims, 4 Drawing Sheets

INTEGRATED ACCESS DEVICE, ASSOCIATED MODEM BOX AND SPLITTING MODULE

This application claims the benefit, under 35 U.S.C. §365 of International Application PCT/EP2005/054962, filed Sep. 30, 2005, which was published in accordance with PCT Article 21(2) on Apr. 20, 2006 in English and which claims the benefit of European patent application No. 04447229.8, filed Oct. 14, 2004.

The present invention relates to a modem box, a splitting module and an integrated access device.

When delivering voice services to CPE (for "Consumer Premises Equipment"), the voice can be transported over a traditional PSTN/ISDN frequency band (for "Public Switched Telephone Network" and "Integrated Services Digital Network") from a PSTN exchange center (CO for "Central Office"), or in an encoded way via a DSL frequency band (for "Digital Subscriber Line") from a DSLAM (for "DSL Access Multiplexer"). To avoid local interference between the PSTN/ISDN and DSL signals, when they are carried on same physical lines (usual twisted pairs), a splitter is generally used at the CPE.

Then, it is possible to separate the two kinds of signals, the PSTN/ISDN and DSL (generally broadband) signals being typically directed respectively to a telephone and to a modem. The modem is then classically exploited for outputting demodulated signals to a LAN network (for "Local Area Network").

Reversed operations are executed when signals are sent from the CPE to the CO and/or to the DSLAM.

Some modems are provided for being able to output from incoming DSL signals, both demodulated LAN and telephone signals. Further, a modem of that kind may comprise two inputs corresponding respectively to the PSTN/ISDN and DSL signals previously separated by means of a splitter, and two outputs respectively providing the LAN and telephone signals. In such achievements, the telephone signals may come from either the PSTN/ISDN or from the DSL signals.

Those widespread installations involve however tedious operations and cumbersome connections, since a separate splitter is required and two physical interfaces/cables need being connected via a splitter towards the public network, one of them containing the DSL signals and the other, the PSTN/ISDN voice signals.

Other systems have been developed and commercialized for providing DSL and PSTN/ISDN signals from a received grouped signal. They consist in IADs (for "Integrated Access Devices") integrating built-in splitting functions therein.

This proves particularly advantageous because no splitter is required, and this is more practical and pleasant for the users. However, the IADs are exploitable only for determined areas and operators. Namely, depending on the specific requirements thereof, different apparatus are to be manufactured and used.

Those limitations may be annoying not only for manufacturers, which are obliged to adapt their products to each group of specificities, but also for the users. Indeed, their IAD may become unworkable if they want to change their operator or use the same IAD for several operators, or if they have to move or to travel.

For remedying this situation, it would be attractive to improve the flexibility of the IAD apparatus, notably through software options and by trying to encourage standardization agreements between Countries and operators. This, however, will need strains and time, and will probably lead only to partial results.

The present invention concerns an integrated access device that makes possible broad scale manufacturing of products, and that can possibly offer to the users at the same time user-friendly and practical systems on one hand, and flexible exploitation in various Countries and with various operators on the other hand.

The invention also relates to corresponding modem box and splitting module.

It applies notably to the fields of residential and business environments offering both LAN and POTS (for "Plain Old Telephone Service") services.

To this end, the invention first relates to a modem box comprising:
  upside communication means for coupling that modem box with at least two central equipments through central signals between the central equipments and the modem box, the central signals communicated between the modem box and at least one of the central equipments being modulated, those upside communication means comprising at least two upside communication points respectively coupled with the central equipments,
  downside communication means for coupling the modem box with at least two terminal equipments through terminal signals between the terminal equipments and the modem box, those downside communication means comprising at least two downside communication points respectively coupled with the terminal equipments,
  transfer means for doing internal transfers of signals between the upside communication points and the downside communication points in the modem box,
  and modem means for doing transformation between the modulated central signals and demodulated signals among the terminal signals.

According to the invention, the modem box comprises an outer contact surface intended to receive a splitting module, this splitting module being able to do transformation between the central signals and grouped signals formed with a multiplexing of the central signals. Further, the upside communication means comprise at least one connection element arranged with the outer contact surface and including the upside communication points, the connection element being provided for being in contact with at least one respective connection element of the splitting module.

Thus, separate modem box and splitting module are defined for forming an IAD. The splitting module is neither built-in inside the box without possible simple removal, nor completely independent of the box, which would cause drawbacks due to cumbersome and tedious equipment. By contrast, the splitting module can be freely placed with, and removed from, the modem box by a user, thanks to the cooperation of the outer contact surface and connection element of the box on one side, and constitution of the splitting module and connection element thereof, on the other side.

This solution offers a surprising alternative to expected strains for obtaining more flexible IADs with built-in splitter. It is very practical for the users, since once the splitting module is positioned with the modem box, the whole may constitute a global entity easy to handle and that avoids tedious connections due to splitting functions. Thus, it may offer thereby all the advantages of the IAD with integrated splitting.

However, contrary to the latter, it may also enable to provide very easily for flexible changes of operators and/or Countries, and to organize mass fabrication instead of segmented manufacturing. Indeed, it can be observed that the modem box itself is usually independent of the specific operators and Countries, since the modulation and demodulation operations are commonly adopted, or at least compatible between one another. Thus, it is possible to group all required IAD components, except for splitting and possibly associated functions segmented by Countries or operators, in the modem box, and to produce it at a large scale.

As concerns the splitting module, which depends on the type of connection for the grouped signals (namely, connection to the public network) and on the type of splitting, it can be produced at lower adapted volumes and be made on demand for different operators and Countries. Anyway, this splitting module can be provided as a mere small accessory, much easier and cheaper to produce than a complete IAD for manufacturers, and much more practical to carry and store and much less expensive than a complete IAD for end users.

In practice, splitting modules may selectively integrate for example standard connectors like RJ-11 or RJ-45, splitting functions for POTS/ISDN or DSL types, and Country dependent low-pass filters.

As it results from the above, the following advantages of the invention are obtained in preferred embodiments:
- only one physical cable/interface is needed; the user has then only one connection to make to the public network;
- the splitting module is conveniently integrated into the IAD (either inside the modem box or, at least in part, externally in contact therewith); the user then does not need to install and plug a splitter;
- and a decoupled production of modem box and splitting module is possible, notably in view of distinguished large scale manufacturing of modem box and targeted production of splitting module.

In a preferred embodiment, the outer contact surface is arranged in the modem box so as to form a cavity intended to receive the splitting module inside the modem box.

In that way, the joined modem box and splitting module may form a compact entity delimited by the borders of the modem box, except possibly for a restricted area corresponding to an interface of the splitting module for connection to the public network (coupling with the central equipments). This proves particularly user-friendly and pleasant to use, because once put in place, the presence of the separate splitting module is transparent to the user. Further, the splitting module may then be possibly very easy to secure with the modem box for the user.

In an alternative embodiment, the outer contact surface is arranged at an external border of the modem box, so as to enable external contact between the latter and a surface of the splitting module. The presence of reliable securing means between both then becomes more important.

In an advantageous embodiment related to the transfer means, the latter are provided for coupling at least two of the upside communication points with one of the downside communication points.

This may be interesting notably for having DSL signals and PSTN/ISDN signals at the public network side, and derived telephone signals grouped on one line at the user equipment side. Then, the signals coming from the telephone and directed to the public network are advantageously identified at the modem box, and either processed as PSTN/ISDN signals to be transmitted to a central office, or processed as voice DSL signals to be modulated and transmitted to a DSLAM.

In another advantageous embodiment related to the transfer means (preferably compatible with the former one), the latter are provided for coupling at least two of the downside communication points with one of the upside communication points.

This may be interesting notably for having WAN (for "Wide Area Network") DSL signals at the public network side, and derived LAN and telephone signals at the user equipment side.

Preferably, the upside communication points are provided for central signals at respectively different frequency bands.

In such a situation, the sharing of the grouped signals by splitting into two or more central signals is particularly useful, since it avoids being penalized by interference problems.

In preferred achievements, at least two of the upside communication points are respectively provided for DSL signals and telephone service signals, chosen advantageously among PSTN and ISDN signals, and the modem means are provided for the DSL signals.

Then, the DSL signals comprising voice DSL signals, it is advantageous that at least one of the downside communication points is provided for voice signals and that the transfer means are intended to do transfers of the telephone service signals and of the voice DSL signals between the downside communication point for voice signals and the upside communication points for DSL and telephone service signals.

The terms of "voice DSL signals" should be interpreted as covering not only the modulated signals at the public network side, but also the voice signals at the consumer equipment side, corresponding to the DSL signals—namely derived from the latter by demodulation and extraction in the direction from the public network to the consumer equipments, and integrated in the latter by combination with the LAN signals and by modulation in the reverse direction.

The invention further relates to a splitting module comprising:
- upside communication means for coupling the splitting module with at least two central equipments, through grouped signals formed with a multiplexing of central signals in relation with respectively the central equipments, the central signals communicated between the splitting module and at least one of the central equipments being modulated, those upside communication means comprising an upside communication point coupled with the central equipments,
- downside communication means for coupling the splitting module with at least two terminal equipments, through the central signals, those downside communication means comprising at least two downside communication points respectively intended for the central equipments, those downside communication points associated with the modulated central signals being intended to be coupled to at least one of the terminal equipments via a modem box,
- and splitting means for doing transformation between the grouped signals at the upside communication point and the central signals at the downside communication points.

According to the invention, the splitting module comprises an outer contact surface intended to be placed against an outer contact surface of the modem box, and the downside communication means comprise at least one connection element arranged with the outer contact surface of the splitting module and including the downside communication points. This connection element is provided for being in contact with at least one respective connection element of the modem box.

The splitting module is preferably provided for cooperating with any of the embodiments of the modem box.

In a preferred embodiment, the splitting module comprises filtering means.

The latter can comprise low-pass and/or high-pass filters, herein-below denoted respectively LPF and HPF filters.

Advantageously, different filtering means are arranged downstream the splitting means (namely between the splitting means and the downside communication means) for the various downside communication points.

Thus, in preferred embodiments of the filtering means for which the downside communication points are respectively associated with POTS and DSL signals (the central signals):
- an LPF filter is provided for the POTS signals, and no filter is provided for the DSL signals;
- or an LPF filter is provided for the POTS signals, and a HPF filter is provided for the DSL signals.

Also, the invention is concerned with an integrated access device characterized in that it comprises a modem box and a splitting module according to any compatible embodiments of the invention, the splitting module being able to cooperate with the modem box, and maintaining means for enabling to fix the splitting module with the modem box and to dissociate the splitting module and the modem box, while keeping integrity of the splitting module and of the modem box.

The invention will be better understood and illustrated by means of the following embodiments and execution examples, in no way limitative, with reference to the appended figures on which:

Figure 1:
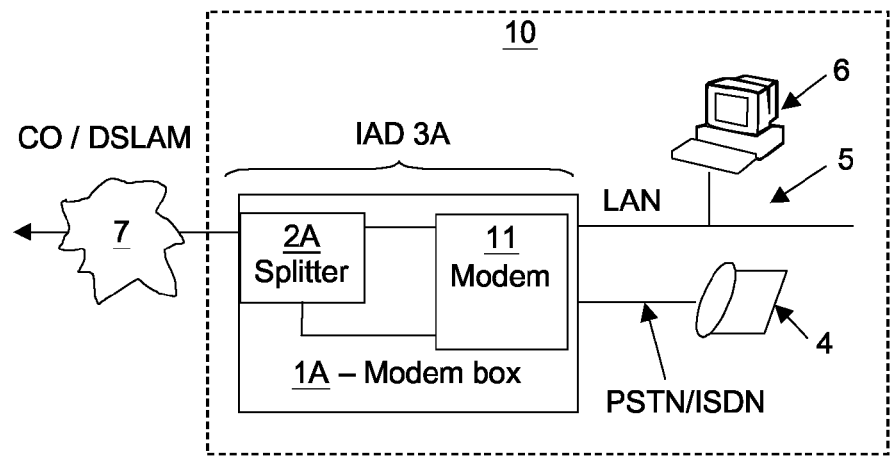
FIG. 1 is a block diagram of a first embodiment of an integrated access device (IAD) compliant with the invention, comprising a modem box and a splitting module, in a residential/business environment.
Figure 3:
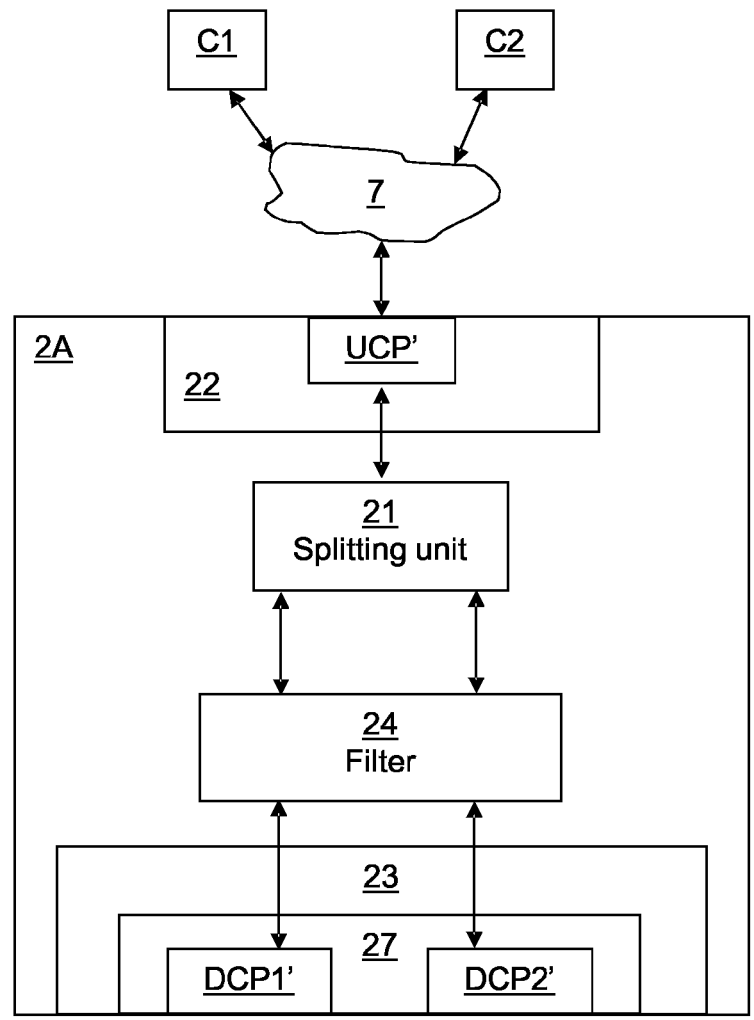
FIG. 3 is a block diagram detailing the splitting module of FIG. 1.
Figure 2:
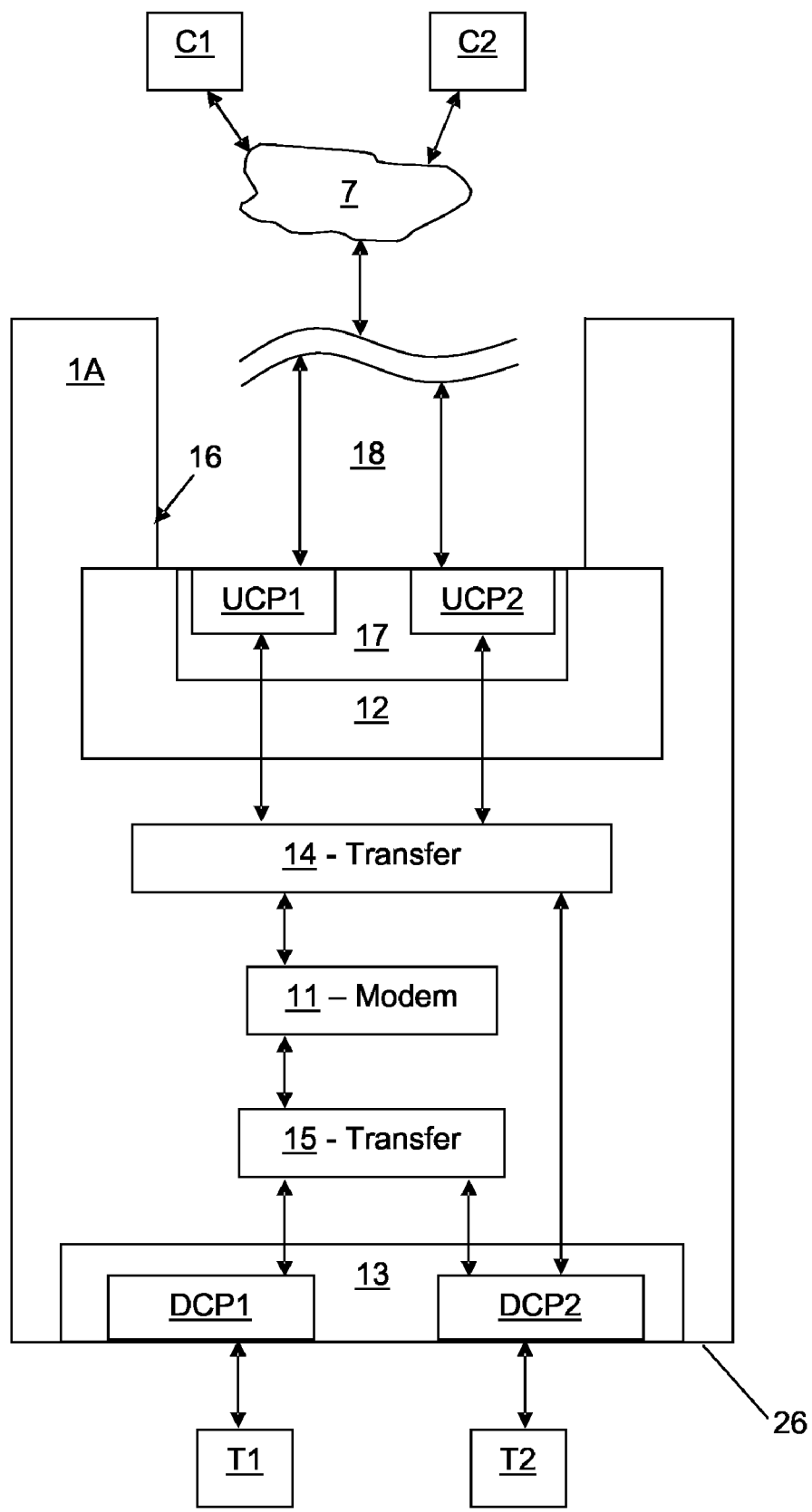
FIG. 2 is a block diagram detailing the modem box of FIG. 1.
Figure 5:
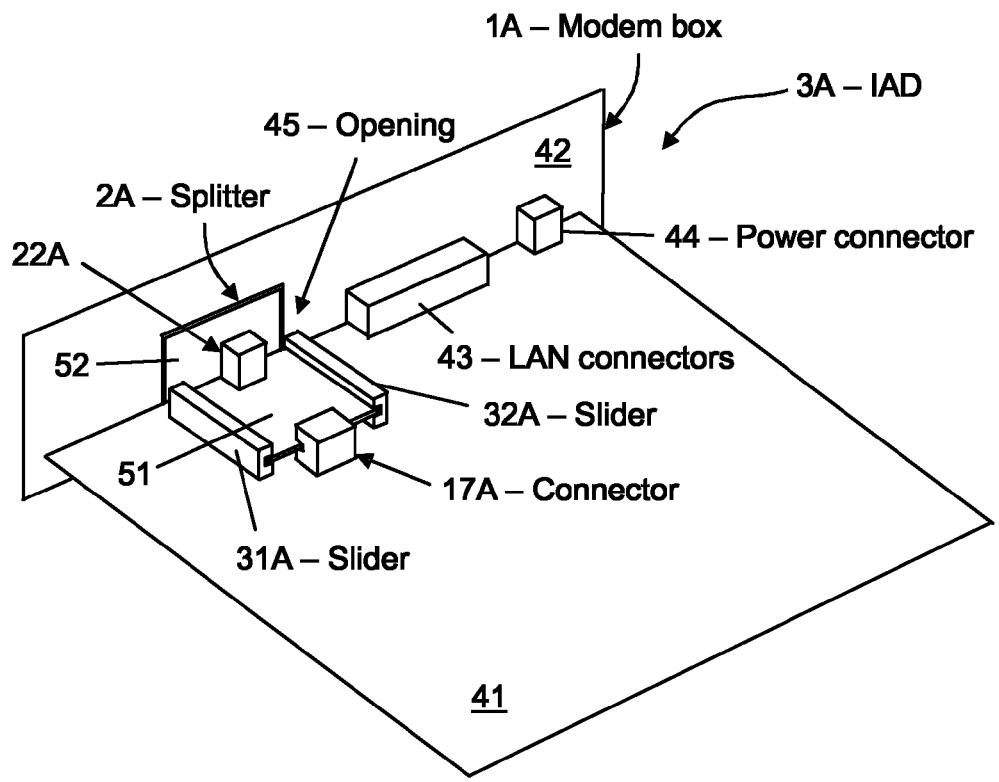
Figure 6:
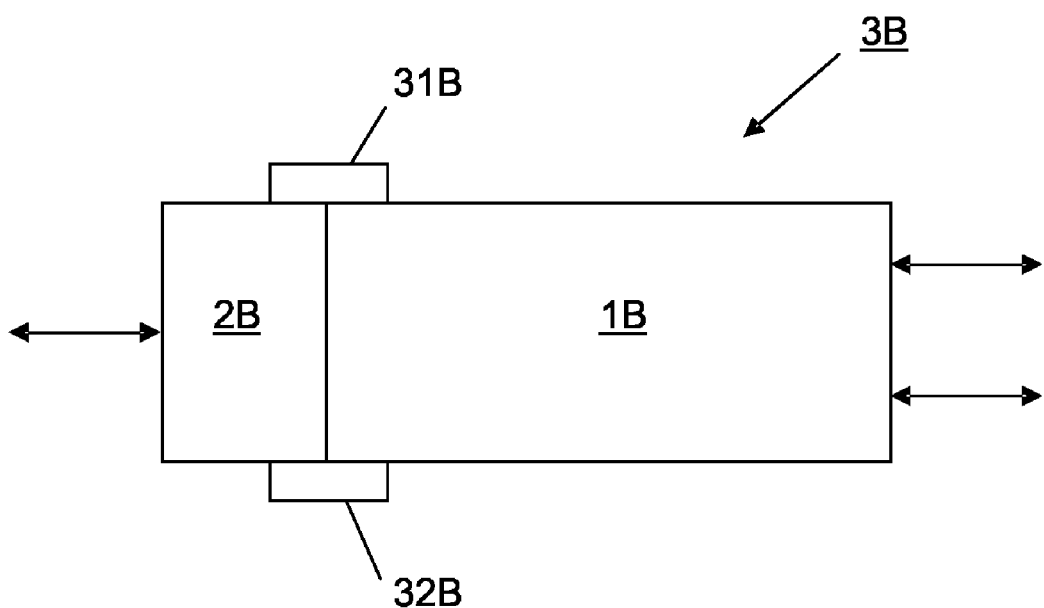

FIG. 5 details some parts of the modem box of FIG. 2 and splitting module of FIG. 3 in another implementation of the IAD of FIG. 1;

and FIG. 6 shows schematically a second embodiment of an IAD compliant with the invention.

In FIGS. 2 and 3, the represented blocks are purely functional entities, which do not necessarily correspond to physical separated entities. Namely, they could be developed in the form of software, or be implemented in one or several integrated circuits. Further, on FIGS. 1 to 3 and 6, the true dimensions of the physical elements have purposely not been respected, for clarity.

Moreover, a generic number notation is liable to be completed by letters referring to the concerned embodiment (A or B), a generic letter notation is liable to be completed by numbers (1 or 2) referring to the concerned entity in an embodiment, and an apostrophe is liable to distinguish elements in the splitting module that correspond respectively to elements in the modem box. Anyway, similar elements may also be noted with the same references, by sake of convenience.

A residential or business environment 10 (FIG. 1) comprises at least one telephone 4 and a local area network (or LAN) 5 with for example a computer 6. It is connected via a public network 7 to central equipments including a central office (or CO) for PSTN/ISDN voice signals and a DSL access multiplexer (or DSLAM) for DSL signals. Those signals are communicated jointly through a communication medium, constituted with usual twisted pairs.

The link to the public network 7 on one hand, and the telephone 4 and LAN 5 on the other hand, are interfaced by means of an IAD 3, noted 3A in a first embodiment. The latter enables in one direction to produce from the received mixed PSTN/ISDN and DSL signals, voice and LAN signals, and in the reverse direction to produce from the voice and LAN signals, mixed PSTN/ISDN and DSL signals intended for the public network 7.

The IAD 3 is able to execute the following operations, for the direction from the public network 7 to the consumer equipment (and corresponding reverse operations in the reverse direction):
- separating the DSL signals from the PSTN/ISDN signals, demodulating the DSL signals;
- extracting from the DSL signals the voice DSL signals and the LAN signals;
- and conveying the voice DSL signals and the PSTN/ISDN signals to an output associated with the telephone 4, and the LAN signals to another output associated with the LAN 5.

The IAD 3A includes essentially a modem box 1 and a splitter 2, noted respectively 1A and 2A in the present embodiment. The splitter 2A is in charge of splitting the signals received from the public network 7 into the DSL and the PSTN/ISDN signals. The modem box 1A has a function of demodulating the DSL signals, by means of a modem 11, and of extracting from the obtained demodulated signals, the voice DSL and LAN signals. It is also provided for conveying the signals to the right outputs, respectively intended for the telephone 4 and LAN 5.

The modem box 1 and splitter 2 are also provided with all corresponding functionalities for the reverse direction, and this will be implicit in the following passages of the description.

The modem box 1A and the splitting module 2A will be now disclosed more in detail (FIGS. 2 to 5). For brevity, we note C1 and C2 respectively the two central equipments constituted by the CO and the DSLAM, and T1 and T2 the terminal equipments corresponding respectively to the LAN 5 and the telephone 4.

The modem box 1A comprises (FIG. 2), further to the modem 11, an upside communication module 12 for receiving the PSTN/ISDN signals and the DSL signals coming from the splitter 2A. The upside communication module 12 includes a connection element 17 provided with two upside communication points UCP1 and UCP2, respectively associated with the two central equipments C1 and C2 (namely, PSTN/ISDN and DSL signals). The connection element 17 is intended to be in contact with a corresponding connection element of the splitter 2A.

The modem box 1A also comprises a downside communication module 13 for transmitting the LAN and voice signals to the terminal equipments T1 and T2, respectively. It includes two downside communication points DCP1 and DCP2 respectively associated with the two terminals T1 and T2.

Also, transfer modules 14 and 15 are provided in the modem box 1A for conveying signals from the upside communication points UCP1 and UCP2 to the downside communication points DCP1 and DCP2, respectively upstream and downstream the modem 11 ("upstream" and "downstream" being defined for the direction from the public network 7 to the consumer equipments).

More specifically, in operation, the transfer module 14 conveys the DSL signals to the modem 11 and the PSTN/ISDN signals to the downside communication point DCP2 (for the telephone 4), while the transfer module 15 conveys the demodulated signals derived from the DSL signals, consisting in the LAN signals and the voice DSL signals, to respectively the downside communication points DCP1 and DCP2.

At the level of the upside communication module 12, a cavity 18 is formed in the modem box 1A, delimited by an outer contact surface 16. This cavity 18 is adapted to receive the splitter 2A inside. Further, when the splitter 2A put in place, the connection element 17 of the modem box 1A is in contact with the connection element of the splitter 2A, so that the PSTN/ISDN and DSL signals coming from the latter are directly transferred to the upside communication points UCP1 and UCP2 of the modem box 1A.

The splitter 2A (FIG. 3) comprises a splitting unit 21 for splitting received multiplexed signals into separated PSTN/ISDN and DSL signals (and for performing a combining operation in the reverse direction). It also includes an upside communication module 22 provided with an upside communication point UCP' for receiving the combined signals, and an downside communication module 23 provided with downside communication points DCP1' and DCP2' for outputting respectively the PSTN/ISDN and DSL signals derived from the combined signals.

The downside communication points DCP1' and DCP2' are carried by a connection element 27 of the downside communication module 23, provided for being in contact with the connection element 17 of the modem box 1A when the splitter 2A is in position within the cavity 18. In this position, the splitter 2A has an outer contact surface 26 that is partly placed against the outer contact surface 16 of the modem box 1A.

The splitter 2A also comprises a low-pass filter module 24 downstream the splitting unit 21. This filter module 24 consists in fact in two filter components placed respectively on the split paths between the splitting unit 21 and the downside communication points DCP1' and DCP2', made respectively of an LPF filter (PSTN/ISDN signals) and a HPF filter (DSL signals). In a variant embodiment, the filter module 24 includes only the LPF filter for the downside communication point DCP1', and no filter for the downside communication point DCP2'.

Figure 4:
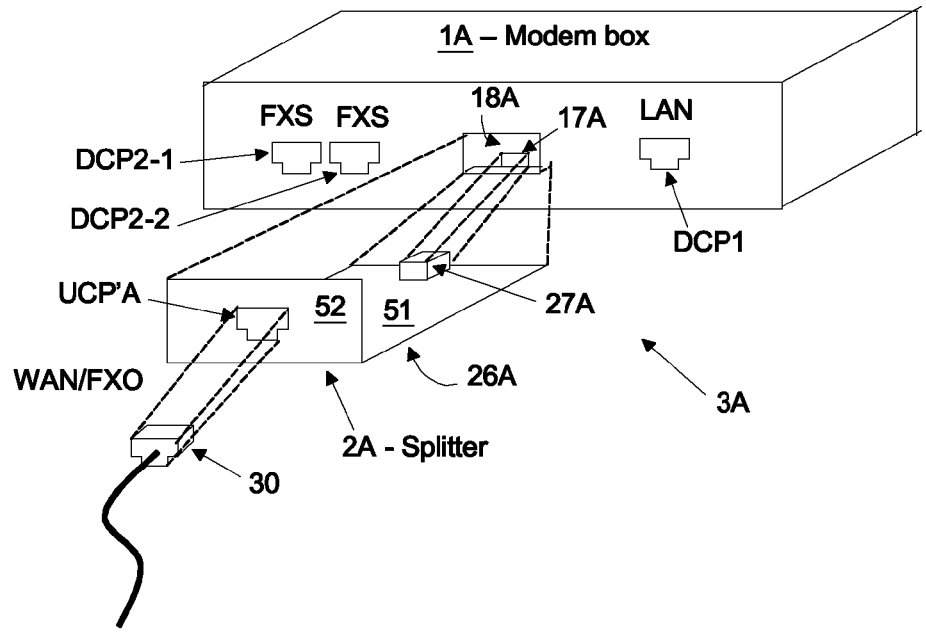
FIG. 4 shows in perspective, a particular implementation of the IAD of FIG. 1.

The modem box 1A and splitter 2A of the IAD 3A will be detailed in more specific examples (FIGS. 4 and 5).

In a first one (FIG. 4), the modem box 1A (FIG. 1A) comprises two downside communication points DCP2 intended for telephones, noted DCP2A-1 and DCP2A-2. They form FXS interfaces (for "Foreign eXchange Subscriber"). It also comprises the downside communication point DCP1 in the form of a LAN interface DCP1A. The cavity 18 is here a rectangular opening 18A with its connection element 17 formed with a female connector X, referenced 17A. The modem box 1A is independent from both the considered Country and operator.

The splitter 2A comprises a main board 51, which includes not represented electronic splitter (splitting unit 21) and filter components (filter module 24) adapted to the particular Country and operator. The main board 51 is provided for being inserted into the opening 18A, and to be positioned therein partially in contact with the contact surface 16 inside the opening 18A—the splitter 2A having its contact surface 26, noted 26A, in contact with the latter. For example, the main board 51 is maintained by means of sliders inside the opening 18A (the edges of the main board 51 are then parts of the contact surface 26A and the internal parts of the sliders are parts of the contact surface 16).

The upside communication point UCP' of the splitter 2A, noted UCP'A, has a form of a mixed WAN (for "Wide Area Network") and FXO (for "Foreign exchange Office") interface for respectively DSL and PSTN/ISDN signals. It is carried by a connector of the upside communication module 22, such as for example a female RJ-11 or RJ-45 connector adapted to a male connector 30 corresponding thereto, depending on the specific connection type in the concerned Country.

The splitter 2A also includes the connection element 27 in the form of a male connector X, referenced 27A, able to cooperate with the female connector X of the modem box 1A.

Due to their constitution, the modem box 1A is independent of the concerned Country or operator, while the splitter 2A depends thereon. When the splitter 2A is put in place inside the opening 18A, the modem box 1A and the splitter 2A form together the IAD 3A as a compact apparatus adapted to the wished Country (or Countries) and operator(s), and having its WAN/FXO interface and its FXS and LAN interfaces.

In another specific implementation example of the IAD 3A (FIG. 5), the modem box 1A has a main board 41 bordered with a backpanel 42, which is provided with an opening 45 for receiving the splitter 2A. The modem box 1A also comprises (notably) LAN connectors 43 and a power connector 44. Around the opening 45 for the splitter 2A, there is further arranged two side sliders 31A and 32A for inserting the splitter 2A, together with the connection element 17 in the form of a connector 17A, defining the limit of driving in the splitter 2A in the modem box 1A.

The splitter 2A is, as for it, provided (notably) with its module board 51 including electronic splitter and filter components, the backpanel 52 and the upside communication module 22 in the form of a block 22A (and also with the connection element 27, not visible in FIG. 5). When the splitter 2A is put in place, its main board 51 is fixed between the sliders 31A and 32A and the connector 17A, and its backpanel 52 is positioned at the opening 45 of the modem box 1A backpanel 42.

In a second embodiment of the IAD 3, noted 3B (FIG. 6), the modem box 1 and the splitter 2, noted respectively 1B and 2B, cooperate without insertion of the splitter 2 in the modem box 1. Instead, the modem 1B and the splitter 2B have their respective flat contact surfaces 16 and 26 as flat faces with same dimensions, intended to be placed against each other and enabling thereby the contact between their respective connection elements 17 and 27.

The IAD 3 includes side attachments 31B and 32B (for example catches, or any usual maintaining means convenient for the user) for maintaining the modem box 1B and splitter 2B in joined position.

The invention claimed is:

1. Modem box comprising:
upside communication means for coupling said modem box with at least two central equipments through central signals between said central equipments and said modem box, the central signals communicated between said modem box and at least one of said central equipments being modulated, said upside communication means comprising at least two upside communication points respectively coupled with said central equipments, downside communication means for coupling said modem box with at least two terminal equipments through terminal signals between said terminal equipments and said modem box, said downside communication means comprising at least two downside communication points respectively coupled with said terminal equipments, transfer means for doing internal transfers of signals between said upside communication points and said downside communication points in said modem box, and modem means for doing transformation between said modulated central signals and demodulated signals among said terminal signals, wherein said modem box comprises an outer contact surface arranged in said modem box so as to form a cavity and intended to receive a splitting module inside said modem box so that the joined modem box and splitting module form a compact entity delimited by the borders of the modem box, said splitting module being able to do transformation between said central signals and grouped signals formed with a multiplexing of said central signals, and in that said upside communication means comprise at least one connection element arranged with said outer contact surface and including said upside communication points, said connection element being provided for being in contact with at least one respective connection element of said splitting module.

2. Modem box according to claim 1, wherein said transfer means are provided for coupling at least two of said upside communication points with one of said downside communication points.

3. Modem box according to claim 1, wherein said transfer means are provided for coupling at least two of said downside communication points with one of said upside communication points.

4. Modem box according to claim 1, wherein said upside communication points are provided for central signals at respectively different frequency bands.

5. Modem box according to claim 1, wherein at least two of said upside communication points are respectively provided for Digital Subscriber Line, noted DSL, signals and telephone service signals, chosen advantageously among Public Switched Telephone Network and Integrated Services Digital Network signals, and said modem means are provided for said DSL signals.

6. Modem box according to claim 5, wherein said DSL signals comprising voice DSL signals, at least one of said downside communication points is provided for voice signals and said transfer means are intended to do transfers of said telephone service signals and of said voice DSL signals between said downside communication point for voice signals and said upside communication points for DSL and telephone service signals.

7. Integrated access device, wherein it comprises a modem box according to claim 1, a splitting module able to cooperate with said modem box, and maintaining means for enabling to fix said splitting module with said modem box and to dissociate said splitting module and said modem box, while keeping integrity of said splitting module and of said modem box.

* * * * *